United States Patent [19]

Garrett et al.

[11] Patent Number: 4,951,271
[45] Date of Patent: Aug. 21, 1990

[54] FLEXTENSIONAL HYDROPHONE

[75] Inventors: Steven L. Garrett, Pebble Beach; Donald A. Danielson, Carmel, both of Calif.

[73] Assignee: The United States of America as represented by the Secretary of the Navy, Washington, D.C.

[21] Appl. No.: 341,594

[22] Filed: Apr. 17, 1989

[51] Int. Cl.$^5$ .............................................. H04R 1/02
[52] U.S. Cl. .................................. 367/141; 367/149; 356/345
[58] Field of Search ................ 181/122; 367/140, 141, 367/149, 157, 159, 162, 165, 166, 167, 171, 172, 178, 180, 188; 73/655–657; 350/96.29, 96.30; 250/250; 356/345, 360

[56] References Cited

U.S. PATENT DOCUMENTS

| 4,384,351 | 5/1983 | Pagliarini, Jr., et al. | 367/175 |
| 4,409,681 | 10/1983 | White | 367/166 |
| 4,534,222 | 8/1985 | Finch et al. | 73/653 |
| 4,613,752 | 9/1986 | Davis | 250/277 |
| 4,858,206 | 8/1989 | McMahon | 367/163 |
| 4,862,430 | 8/1989 | Klein | 367/168 |

OTHER PUBLICATIONS

Brigham, G. and Glass, B., "Present Status in Flextensional Transducer Technology". *The Journal of the Acoustical Society of America,* vol. 68, no. 4, Oct. 1980, pp. 1046–1052.
Royster, L. H., "The Flextensional Concept: A New Approach to the Design of Underwater Acoustic Transducers", *Applied Acoustics,* (3) (London, England; Elsevier Publishing Company Ltd., 1970) pp. 117–125.
Nelson, R. A. and Royster, L. H., "Development of a Mathematical Model for the Class V Flextensional Underwater Acoustic Transducer", *The Journal of the Acoustical Society of America,* vol. 49, May 1971, pp. 1609–1620.
Gardner, D. L., and Garrett, S. L., "Fiber Optic Seismic Sensor" *Proceedings of the Society of Photo-Optical Instrumentation Engineers,* vol. 838, Fiber Optic and Laser Sensors V (1987) pp. 271–277.

*Primary Examiner*—Brian S. Steinberger
*Attorney, Agent, or Firm*—Sol Sheinbein; Melvin J. Sliwka; Stephen J. Church

[57] ABSTRACT

An omnidirectional hydrophone having an elastic shell which is spheroidal so that the circumference of the shell about different axes changes differentially when the shell is subjected to pressure variations. The differences in circumference are advantageously measured by an optical fiber interferometer having one leg wound about the equatorial circumference of the shell and another leg wound about its meridional circumference. The shell may be an oblate spheroid having the ratio of its major axis to is minor axis greater than about $(2-\nu)^{\frac{1}{4}}$, where $\nu$ is Poisson's ratio of the shell material, so that the shell narrows along one axis and widens along the other when the shell is subjected to a pressure change.

20 Claims, 5 Drawing Sheets

FLEXTENSIONAL HYDROPHONE

BACKGROUND OF THE INVENTION

1. Field of the Invention

This invention relates to acoustic vibration sensing apparatus having a light transmitting fiber.

2. Description of the Prior Art

Many sensors for acoustic vibrations and other fluid pressure effects are well known and have various deficiencies such as low sensitivity, response that varies undesirably with direction, high cost, limited maximum pressure, and errors due to temperature and static pressure. The flexure or other strain of a primary elastic element subjected to a pressure difference is a well-known basis for acoustic and other pressure measurements, the amount of flexure typically being determined directly, or by piezoelectric, capacitive, or resistive changes in secondary elements associated with the primary element.

It is well-known to generate acoustic vibrations by an elastic shell which is generally ellipsoidal and has an internal piezoelectric disk or rod extending across the equator of the shell and coupled thereto so that, when electric signals of the usual frequencies employed with hydrophones are applied to the piezoelectric element, the resulting dimensional changes thereof cause the shell to oscillate and project corresponding acoustic vibrations in a surrounding fluid. Such a prior art projecting device, which has been termed a "flextensional transducer", is, therefore, an impedance transducer for converting vibrations of a piezoelectric element to fluid vibrations. Insofar as known to the present applicants, the use and sensitivity of a similar shell as the primary element of a receptor for acoustic vibrations has never been previously considered. In such prior art projecting transducers, the ellipsoidal shell is forced to oscillate in an equatorial plane or, in many cases, only along one axis of such a plane, so that the ratio of the lengths of the minor and major axes of the shell is not significant and has not been investigated. Also, in such a prior art transducer the forced shell oscillations are not significantly affected by temperature as is typically the case with such secondary elements used in an acoustic vibration sensor.

Interferometric measurements of strain can provide great resolution and, when carried out with an optical fiber, can provide a simple and rugged sensor which requires low power, is immune to many forms of interference, and is adapted to remote sensing of pressure variations and to high data rates. However, optical fibers are relatively insensitive per unit length when used directly for measurement of pressure variations and are subject to errors due to static pressure, temperature, and the like. Increase in leg length to provide greater sensitivity typically increases such errors proportionately, and interferometers having an optical fiber leg are particularly subject to error from temperature caused variations in the length of the leg. It is known to minimize these errors by a "push-pull" arrangement of a pair of interferometer optical fiber legs where a change in a measured variable shortens one leg and lengthens the other while both legs change length together with variations in temperature and static pressure. However to be effective, this interferometric rejection of common mode errors requires that both legs be subject to the same conditions.

It is known to provide optical fiber interferometric measurements of pressure and variations thereof by arranging a resilient cylinder, which is wound with an optical fiber, for compression resulting from strain of a primary element so that lateral expansion of the cylinder lengthens the fiber. This optical fiber arrangement for pressure measurement is effective and is adapted to push-pull operation by using two cylinders and winding an optical fiber leg under tension on each cylinder, but is somewhat limited in sensitivity. Also, typical existing such arrangements are directional, are relatively complex in construction since the fibers and cylinders are disposed within a primary sensing element, and reject common mode errors imperfectly since the push-pull optical fiber legs are separated to some extent spatially and thermally.

SUMMARY OF THE INVENTION

It is, therefore, an object of the present invention to provide a hydrophone or other acoustic vibration sensor which is omnidirectional, is of very simple construction, and is highly sensitive.

Another object is to provide optimized configurations for a spheroidal, elastic shell of such a sensor.

Still another object is to provide such a sensor which is particularly adapted to include a fiber optic interferometer having a pair of legs in a push-pull arrangement.

Yet another object is to provide such a sensor which is conveniently connectable in an array and to remote interferometric sources and detectors.

These and other objects and advantages are provided by the present invention of an omnidirectional hydrophone or other acoutic vibration sensing apparatus having an ellipsoidal and elastic shell which flexes when subjected to pressure variations so that the circumference of the shell, as measured in different directions, varies diffrentially. This differential strain may be effectively measured by an optical fiber interferometer having one leg wound about the equatorial circumference of the shell and the other leg wound about its meridional circumference. A hydrophone of the present invention is particularly effective when the shell is an oblate spheroid having the ratio of its major axis to its minor axis greater than about $(2-\nu)^{\frac{1}{2}}$, where $\nu$ is Poisson's ratio of the shell material, so that the shell narrows along one axis and widens along the other when subjected to a pressure change.

BRIEF DESCRIPTION OF THE DRAWINGS

The features of the present invention will be apparent from the following detailed description when considered in conjunction with the accompanying drawings wherein.

DETAILED DESCRIPTION

Figure 1:
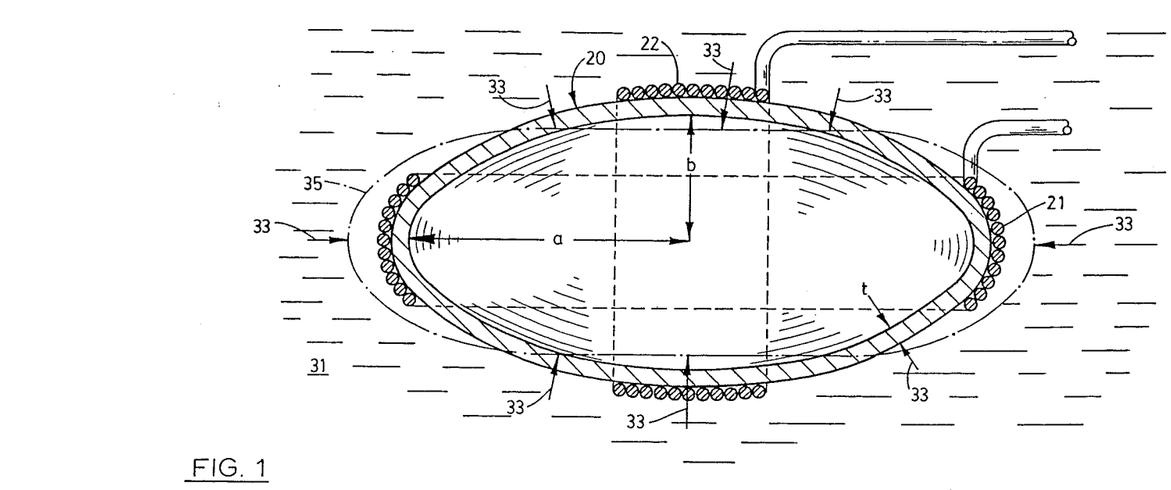
FIG. 1 is a section of a hydrophone which is a first embodiment of the present invention, this embodiment being characterized by an elastic, isotropic and oblate spheroidal shell having optical fibers wrapped meridionally and equatorially about the shell exterior. The shell is depicted as immersed in a fluid, and a dot-dash ellipse indicates a configuration of the shell resulting from increasing fluid pressure represented by arrows.

Certain principles of the present invention will first be described with reference to FIGS. 1 and 2, which show a first embodiment of the present invention characterized by an oblate spheroidal shell 20 having, externally, an equatorial wrapping 21 and a meridional wrapping 22 of optical fiber, and to FIG. 3, which shows a second embodiment of the present invention characterized by a prolate spheroidal shell 25 also having, externally, an equatorial wrapping 26 and a meridional wrapping 27 of optical fiber. Shells 20 and 25 are of substantially uniform thickness and are constructed of any suitable elastic and isotropic material. These shells are depicted as having their major diameters about twice their minor diameters for reasons which are subsequently presented. Shells 20 and 25 are adapted for immersion in a fluid 31 having pressure variations or acoustic vibrations to be sensed by a hydrophone or other pressure variation sensor incorporating a shell such as shell 20 or 25 and its respective wrappings 21 and 22 or 26 and 27. An increasing such pressure variation is indicated in FIGS. 1 and 3 by arrows 33, and the resulting configuration of shells 20 and 25 relative to their depicted configuration at some relatively lower pressure is indicated by dot-dash ellipse 35 in FIG. 1 and a corresponding ellipse 36 in FIG. 3, the relative change in configuration being exaggerated for illustrative purposes.

It is intuitively apparent that, when a thin, elastic, and isotropic spherical shell of uniform thickness is subjected to an increasing external pressure which is uniform over the shell exterior as occurs when a shell is subjected to fluid acoustic vibrations having a wavelength relatively long in relation to the longest exterior dimension of the shell, such a spherical shell will decrease uniformly in radius. In FIG. 3 and similarly to such a spherical shell, the increased pressure configuration ellipse 36 is everywhere within prolate shell 25. Ellipse 36 is closer to shell 25 at some places than others, a result believed intuitively apparent from the non-spherical configuration of shell 26. However as shown in FIG. 1 and believed not apparent to one skilled in the art of acoustic vibration sensors, ellipse 35 is within oblate shell 20 at some places but is outside at other places. A decreasing pressure variation would result in an opposite change in these relative configurations; that is, the prolate surface of shell 25 would be everywhere outside its depicted position, whereas the shell 20 oblate surface would be outside the FIG. 1 position where ellipse 35 is inside and inside the FIG. 1 position where ellipse 35 is outside. The reason for this difference between FIGS. 1 and 3 is highly significant in certain embodiments of the present invention and will be shortly discussed in detail.

However, at this point it is desirable to present certain definitions useful in understanding the present invention. An ellipsoid is a three dimensional surface all of whose sections are either circles or ellipses. A spheroid is an ellipsoid generated by rotating an ellipse about one of its axes and, therefore, having orthogonally related major and minor axes. A prolate spheroid, which is generated by rotation of an ellipse about its major axis, has one longest axis, which is its major axis or pole, and may be considered as having a plurality of shorter or minor axes. An oblate spheroid, which is generated by rotation of an ellipse about its minor axis, has one shortest axis, which is its minor axis or pole, and has a plurality of longer or major axes. Herein, in both prolate and oblate spheroids the equator is in a plane normal to such pole and has a radius represented by "a" with the length of an axis of the spheroid in this plane represented by "A", while each meridian is in a plane including the pole and intersects the pole at a radius "b", the length of the pole as an axis of the spheroid being represented by "B". An equatorial circumference or wrapping, such as wrapping 21 or 26, thus approximates a circle about the pole of a spheroid, and a meridional circumference or wrapping, such as wrapping 22 or 27, approximates an ellipse in the plane of such pole.

Referring again to FIGS. 1 and 3 where it is seen that the semi-minor and semi-minor axes, and thus the corresponding circumferences, of spheroidal shells 20 and 25 vary differently in length when the shell is subjected to a pressure variation due to acoustic vibrations in fluid 31, it is evident that, by fixing optical fiber wrappings, such as wrappings, 21, 22, 26, and 27 on the corresponding shell 20 or 25, these windings will have variations in length corresponding to the acoustic vibrations and to the deformations induced thereby in the shells. It is convenient and preferable to wind such an optical fiber wrapping externally on such a shell and in tension so that each turn of the wrapping contracts as the corresponding shell circumference decreases and so that access is not required to the interior of the shell which may thus be unitarily constructed, as by casting, in a finished condition. Wrappings 21 and 22 or 26 and 27 are thus a pair of strain detecting elements, which extend circumferentially about the corresponding shell 20 or 25 in a pair of directions individually corresponding to the unequal length major and minor axes of the shell, for detecting differential variations in the shell circumferences about these axes.

Figure 2:
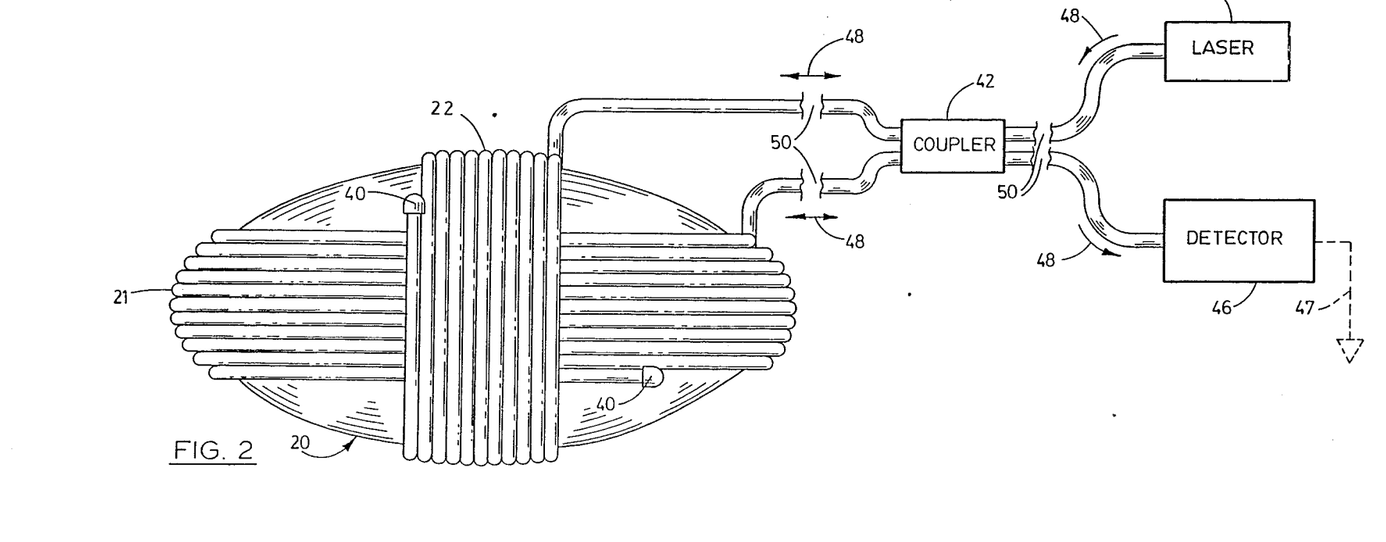
FIG. 2 is an exterior view of the hydrophone of FIG. 1 with the optical fibers connected as legs of a diagrammatically represented interferometer.
Figure 3:
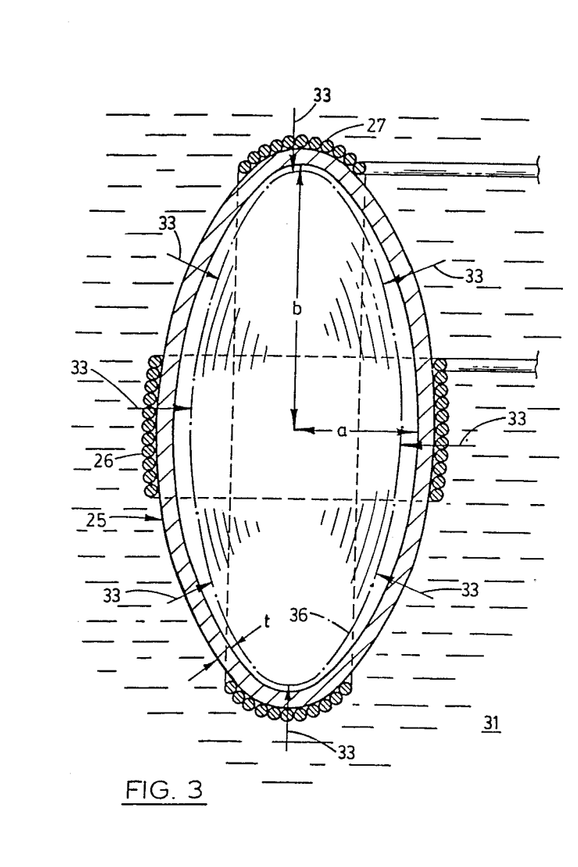
FIG. 3 is a section, similar to FIG. 1, of a hydrophone which is a second embodiment of the present invention and is similar to the first embodiment, but characterized by a prolate spheroidal shell.

These differential variations in shell circumference may be detected interferometrically by connecting such a pair of optical fiber wrappings, such as wrappings 21 and 22, as the legs of a well-known optical fiber Michelson interferometer as shown in FIG. 2. When so connected, one end of each wrapping is a reflector and may be protected by any suitable cap 40. The other wrapping ends are connected to one side of any suitable coupler 42 from the other side of which one optical fiber leads to a laser 44 and another optical fiber leads to a detector 46 which outputs an electronic signal represented by arrow 47. This signal corresponding to interference fringes generated by the varying lengths of the wrappings as light from laser 44 passes through the fibers, as indicated by arrows 48, so as to be reflected from capped ends 40 and interfere in coupler 42. Signal 47 thus corresponds to the differential variations in shell circumference and to the acoustic vibrations in fluid 31.

It will be apparent to one skilled in the art of optical fiber interferometric strain measurement that each of the wrappings 21 or 22 serves as a reference interferometer leg for the other. Typically, one of the wrappings 21 and 22 is wound over the other and both are secured exteriorly to shell 20 by any suitable adhesive. These wrapping are thus spatially close, thermally well connected, and subjected to the same pressure so that, by making the wrappings substantially equal in length, the common mode effects of temperature and static pressure changes on the effective leg lengths may be canceled. As indicated by breaks 50 near coupler 42 in the optical fibers, this coupler may be remote from shell 20, although this reduces sensitivity and rejection of common mode errors, and may be remote from relatively delicate apparatus such as laser 44 and detector 46, as for connection in an array, without undesirable effects on accuracy. In order to increase the sensitivity of a sensor, such as that shown in FIG. 2, it is desirable that the optical fibers forming the wrappings 21 and 22, be of considerable length, typically 10 meters, although usual axial dimensions of shell 20 are in the order of a few centimeters. Each fiber is thus wound in a plurality of turns on the shell. Since the fibers must be of equal length within the coherence length of light from laser 44, a distance of a few centimeters, there is a different number of turns in the pair of wrappings on a spheroidal shell.

It will also be apparent that the sensitivity of such interferometric or other strain measurements of differential variations in the equatorial and meridional circumferences of spheroidal shells, such as shells 20 and 25, is ultimately determined by the relative variation in the circumferences due to a particular pressure variation. This difference is, relatively, much larger for the oblate shell 20, where the crcumferential changes are of opposite sign, than for the prolate shell 25 where these changes are of the same sign and may be relatively small absolutely. However, the prolate spheroidal form of shell 25 is so desirable in certain arrays that the prolate form would be used therein to obtain the other advantages of the present invention despite any reduced sensitivity due to the prolate form.

The relative sensitivity of prolate and oblate shells in fluid acoustic vibration sensors of the present inventon will now be defined. It can be shown, using well-known mathematical functions and operations and the well-known theories of surfaces, of elasticity, and of stresses in plates and shells as applied to an ellipsoidal, thin shell of revolution which is under pressure, constructed of isotropic elastic material, and undergoes a relatively small strain, that:

$$\epsilon_{11} = \frac{-pa^2}{Et}\left[\frac{1-\frac{\nu}{2}}{\sqrt{a^2\sin^2\phi + b^2\cos^2\phi}} - \frac{\sqrt{a^2\sin^2\phi + b^2\cos^2\phi}}{2b^2}\right] \quad (1)$$

$$\epsilon_{22} = \frac{-pa^2}{Et}\left[\frac{\frac{1}{2}-\nu}{\sqrt{a^2\sin^2\phi + b^2\cos^2\phi}} + \frac{\nu\sqrt{a^2\sin^2\phi + b^2\cos^2\phi}}{2b^2}\right] \quad (2)$$

where:

$\epsilon_{11}$ = the strain of an element of the shell in a direction along a circle parallel to the equator thereof, $\epsilon_{>}$ = the strain of an element of the shell in a direction along a meridian thereof, $\phi$ = the angle between the normal to the element and the axis of revolution of the ellipses defining the surface, t = the thickness of the shell, E = the modulus of elasticity, Young's modulus, for the shell material, $\nu$ = Poisson's ratio for the shell material, a = the length of a semi-equatorial axis of the shell, b = the length of a semi-meridional or polar axis, and of the shell, p = the pressure difference between the interior and exterior of the shell.

These expressions for strain are derived using membrane theory which applies to a "thin" shell. Such a shell is defined as one in which the distribution of stress across the thickness is uniform, that is, generally the same radially across the shell. It is known that membrane theory is precisely correct as applied to an ellipsoidal shell when:

$$t << b^4/a^3 \text{ for } a \geq 2b$$

$$t << a^2/3b \text{ for } a \leq b/2$$

However, the results obtained from membrane theory, typically, are substantially or, at least, qualitively correct even for shells which are not, strictly speaking, "thin". The equatorial circumference CE of an ellipsoid is that of a circle of radius a:

$$CE = 2\pi a \quad (5)$$

The meridional circumference $C_M$ is that of an ellipse, and can, therefore, be given exactly only in terms of E(k), the elliptic integral of the second kind:

$$C_M = 4aE\left(\sqrt{1 - \frac{b^2}{a^2}}\right) \text{ for } a \geq b \quad (6)$$

$$C_M = 4bE\left(\sqrt{1 - \frac{a^2}{b^2}}\right) \text{ for } a \leq b \quad (7)$$

E(k) will vary between $\pi/2 \leq E(k) \leq 1$ as k varies between $0 \leq k \leq 1$. The circumference of an ellipse may be approximated by the upperbound:

$$C_M \leq 2\pi\sqrt{\frac{a^2 + b^2}{2}} \quad (8)$$

This expression is exact for a/b = 1 and at worst overestimates the circumference by less than 10% in the limit $a/b \to \infty$ or $a/b \to 0$.

Two quantities of interest for a hydrophone of the present invention are the increase in the lengths of the equatorial and meridional circumferences. The increase in the equatorial circumference $\Delta C_E$ is the product of the strain times $2\pi a$, since $\epsilon_{11}(\pi/2)$ is independent of $\theta$:

$$\Delta C_E = 2\pi a \epsilon_{11}(\pi/2) = \frac{p\pi a^2}{Et}\left[\frac{a^2}{b^2} - (2-\nu)\right] \quad (9)$$

Due to the variation of $\epsilon_{22}$ with $\phi$, the increase in the meridional circumference $\Delta C_M$ must be obtained by integration:

$$\Delta C_M = \int_0^{2\pi} \epsilon_{22} r_2 d\phi = \frac{-p\pi ab}{2Et}\left[\frac{a^2}{b^2} + 1 - 2\nu\right] \quad (10)$$

From this it is apparent that the equatorial circumference increases for oblate spheroids when $a/b > (2-\nu)^{\frac{1}{2}}$, whereas the meridional circumference decreases for all ellipsoids since material stability requires that $\nu \leq \frac{1}{2}$.

Eliminating common factors between equations (7) and (8) and inserting a value for Poisson's ratio of 0.33, a typical value for common engineering metals such as steel and aluminum, and using a ratio of b/a of 2.0 of a prolate ellipsoidal shell, as depicted in FIG. 3, gives the following relative circumferential changes:

$$\frac{Et}{p\pi a^2} = -1.42 \text{ and } \frac{Et}{p\pi a^2} = -0.59$$

where the minus sign indicates reduction in circumference for increasing pressure. For such a prolate shell, the relative differential circumferential change available for sensing by an interferometer similar to that of FIG. 2 is thus about 0.83.

However, a similar calculation for an oblate ellipsoidal shell, as depicted in FIG. 1 and having a ratio of a/b of 2.0, gives these relative circumferential changes:

$$\frac{Et}{p\pi a^2} = 2.33 \text{ and } \frac{Et}{p\pi a^2} = -1.09$$

the relative differential circumferential change for such an oblate ellipsoid is 3.42, an increase in sensitivity of over a factor of four of obtainable by following the principles of the present invention.

Figure 4:
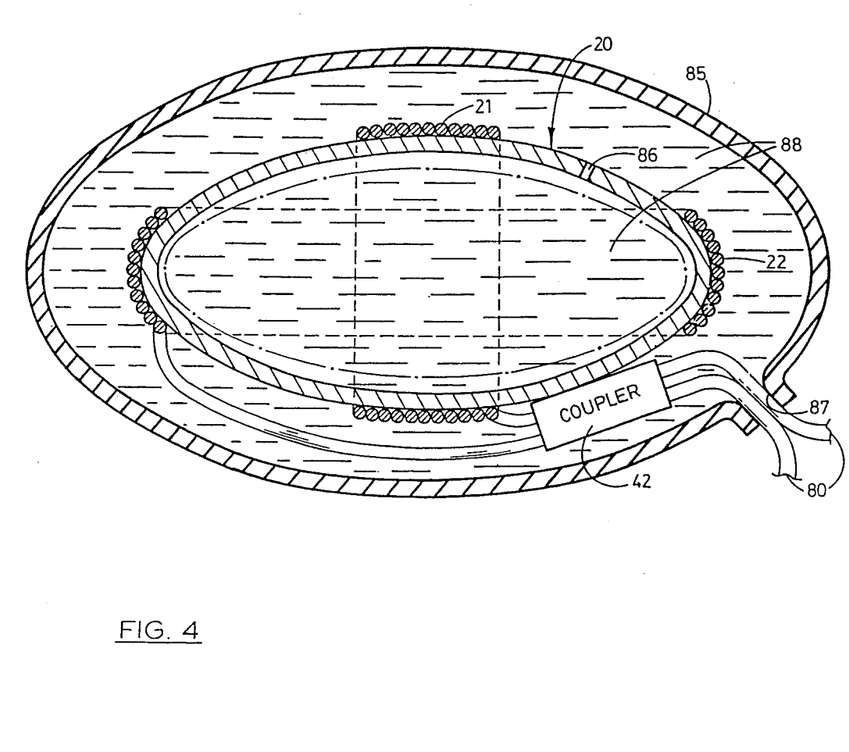
FIG. 4 is a section of a hydrophone of the first embodiment adapted for fluid filled operation.

FIG. 4 shows a hydrophone which is a liquid filled adaptation of the embodiment of FIGS. 1 an 2 and, similarly, has an oblate spheroidal shell 20 and a pair of optical fiber windings 21 and 22 connected to an optical coupler 42. Coupler 42 is depicted in a preferred location adjacent to shell 20 and to windings 21 and 22 for the most effective rejection of common mode errors, other interferometer elements being remote from the shell and connected to the windings at points 80.

The hydrophone of FIG. 4 utilizes a well-known construction in being completely enclosed in an elastomeric envelope or boot 85 and in having shell 20 provided with a relatively small orifice 86 which establishes restricted fluid communication between the interior and the exterior of the shell. The optical fibers of windings 21 and 22 pass through boot 85 by a sealed opening 87. Boot 85 and shell 20 are filled with a quantity of any suitable liquid 88, typically a silicone oil, which can flow within boot 20 between the shell exterior and interior through orifice 86. As a result, liquid 88 equalizes the static pressure of any other fluid in which boot 85 is immersed on both sides of the shell 20 so that the shell need not be constructed to withstand high static pressure. Orifice 86 has dimensions selected in a well-known manner to severely atenuate acoustic vibrations at frequencies of interest and communicated to liquid 88 through boot 85 from a surrounding fluid, so that such vibrations do not result in corresponding fluid pressure variations within shell 20 and so that the shell deflects in response to such acoustic vibrations.

Figure 5:
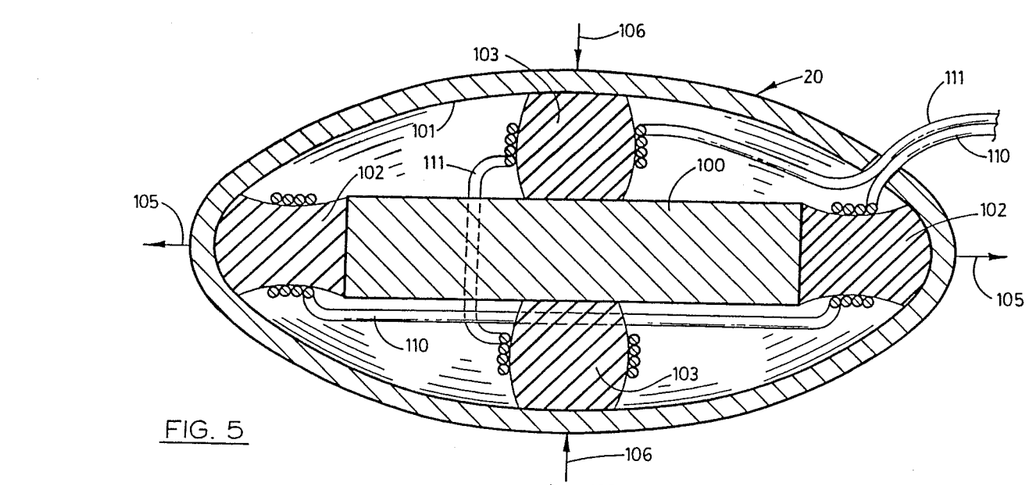
FIG. 5 is a section of a hydrophone, which is a third embodiment of the present invention similar to the first embodiment, but characterized by the oblate spheroidal shell containing elements of a compliant mandril optical fiber interferometer.

FIG. 5 shows a third embodiment of hydrophone of the present invention having an oblate spheroidal shell 20 similar to that of FIGS. 1 and 2 and deforming similarly under an increasing external pressure. This third embodiment hydrophone has a mass 100 disposed centrally within the interior surface 101 of its shell 20 and has four elastomeric cylinders 102 and 103 extending from mass 100 to shell surface 101. Cylinders 102, typically extend oppositely from mass 100 along a major axis of oblate shell 20 so that, as depicted, the length of each of each cylinder 102 increases and its circumference constricts when increasing external pressure expands the shell equatorially as indicated by arrows 105. Cylinders 103 extend oppositely from mass 101 along the minor axis of oblate shell 20 so that each cylinder 103 shortens and its circumference expands when increasing external pressure contracts the shell along said axis as indicated by arrows 106. The size of mass 100 and the elasticity of cylinders 102 and 103 may be selected, in a well known manner, to have a resonant frequency substantially higher than the frequencies of acoustic vibrations for which the third embodiment hydrophone is to be a receptor. As a result, when the hydrophone is subjected to these frequencies mass 100 remains substantially stationary with respect to the shell 20, and the shell and cylinders deform at the acoustic vibration frequencies as depicted in FIG. 5. This mode of operation is in contrast to certain seismic vibration sensors, which have a configuration similar to that shown in FIG. 5, but have the cylindrical fiber mandrils in a given axis as different arms of the interferometer and have a mass with a resonant frequency higher than the frequencies of interest so that the mass oscillates thereat within a stationary and rigid enclosure that translates with the fluid velocity.

The hydrophone of FIG. 5 has an optical fiber 110 wrapped under tension and successively about cylinders 102 and has an optical fiber 111 similarly wrapped about cylinders 103. The relative length of fibers 110 and 111 thus changes in correspondence with the circumferential variations in these cylinders due to acoustic vibrations to which the hydroophone is subjected. These fibers may be used in a push-pull mode as the legs of an interferometer similar to that depicted in FIG. 2 to detect such acoustic vibrations.

Figure 6:
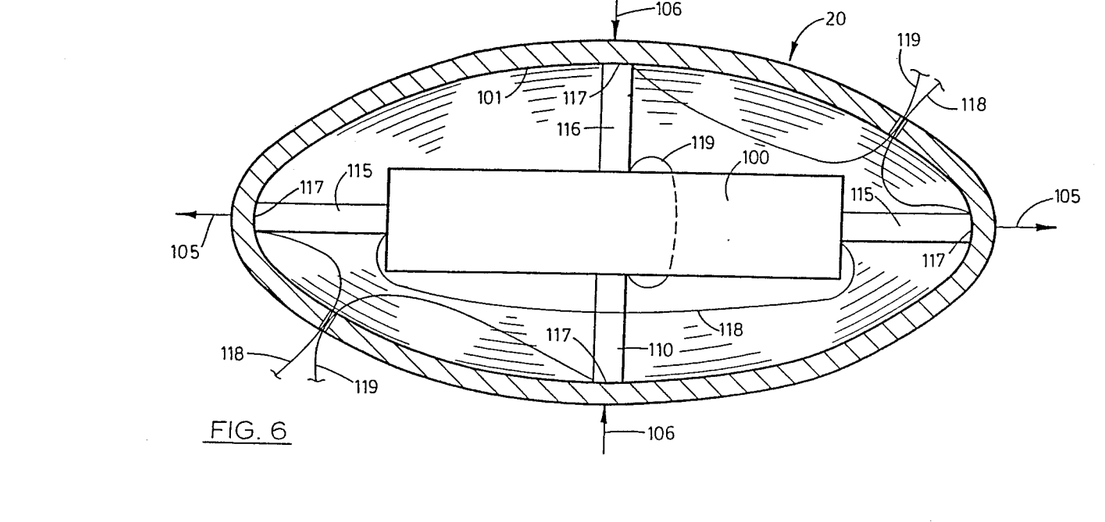
FIG. 6 is a section of a hydrophone which is a fourth embodiment of the present invention similar to the third embodiment, but having the shell contain a plurality of piezoelectric elements.

FIG. 6 depicts a fourth embodiment of hydrophone which is similar to that of FIG. 5 in having an elastic and oblate spheroidal shell 20 surrounding a mass 100 within the interior surface 101 of the shell which deforms under increasing external pressure as indicated by arrows 105 and 106. However, this fourth embodiment has four piezoelectric devices 115 and 116 of any suitable and well-known construction disposed within the shell and connected thereto and to mass 100 in an arrangement, which is similar to that of cylinders 102 and 103, so that devices 115 extend and devices 116 contract as shell 20 is subjected to externally increasing pressure. Mass 100 and devices 115 and 116 thus form a piezoelectric element having opposite end portions 117 connected to shell surface 20. Typically, devices 115 and 116 are relatively stiff so that the resonant frequency of such a piezoelectric element is substantially greater than that of any acoustic frequency of interest in a hydrophone receptor. Therefore, devices 115 may be connected by conductors 118 and devices 116 connected by conductors 119 so that these devices may be utilized in any suitable and well-known manner in a push-pull mode to detect oscillating strain variations in shell 20 due to fluid acoustic vibrations to which the shell is subjected.

Figure 7:
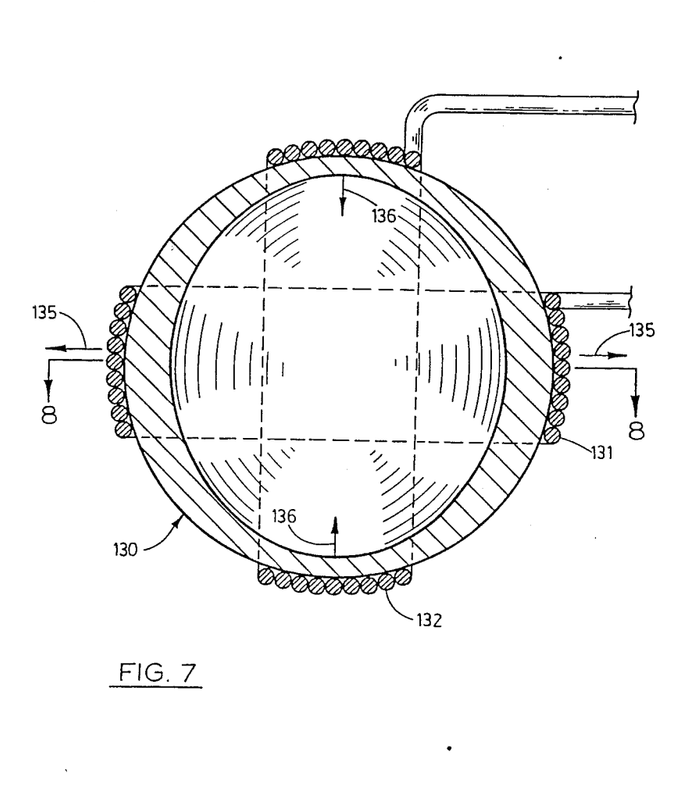
FIG. 7 is a section of a hydrophone which is a fifth embodiment of the present invention characterized by a generally spherical shell of varying thickness.
Figure 8:
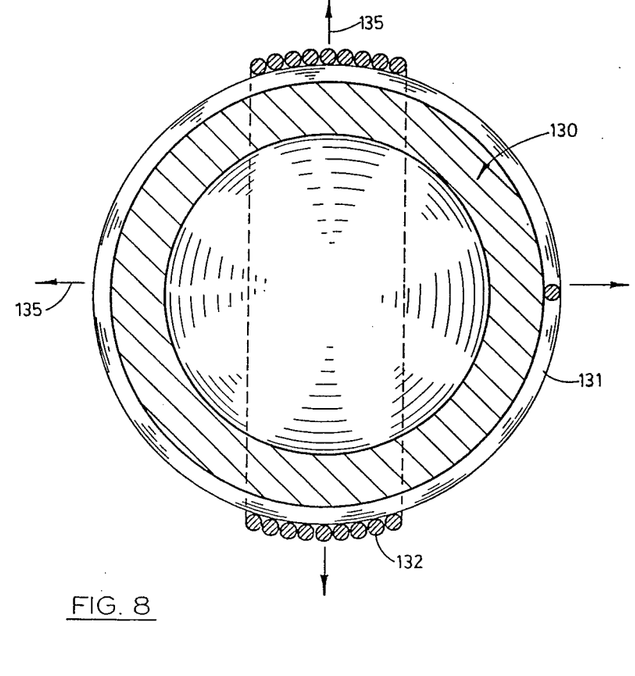
FIG. 8 is a section of the hydrophone of FIG. 7 on line 8—8 thereof.

FIGS. 7 and 8 show a fifth embodiment by hydrophone of the present invention having a generally spherical shell 130 wound equatorially with an optical fiber wrapping 131 and meridionally with another such wrapping 132. Wrappings 131 and 132 may be arranged in the same manner as wrappings 21 and 22 to detect interferometrically differential variations in the circumference of shell 130 due to acoustic pressure variations to which this shell is subjected. In contrast to a spherical shell of constant thickness, which has no such differential variation as before stated, shell 130 is constructed in any suitable manner, as by centrifugal casting, so as to be substantially thicker in its equatorial circumferential region corresponding to wrapping 131 than in its meridional circumferential region corresponding to wrapping 132. As a result, when shell 130 is subjected to increasing external pressure it expands equatorially as indicated by arrows 135 in FIGS. 7 and 8 and contracts meridionally as indicated by arrows 136 in FIG. 8.

Figure 9:
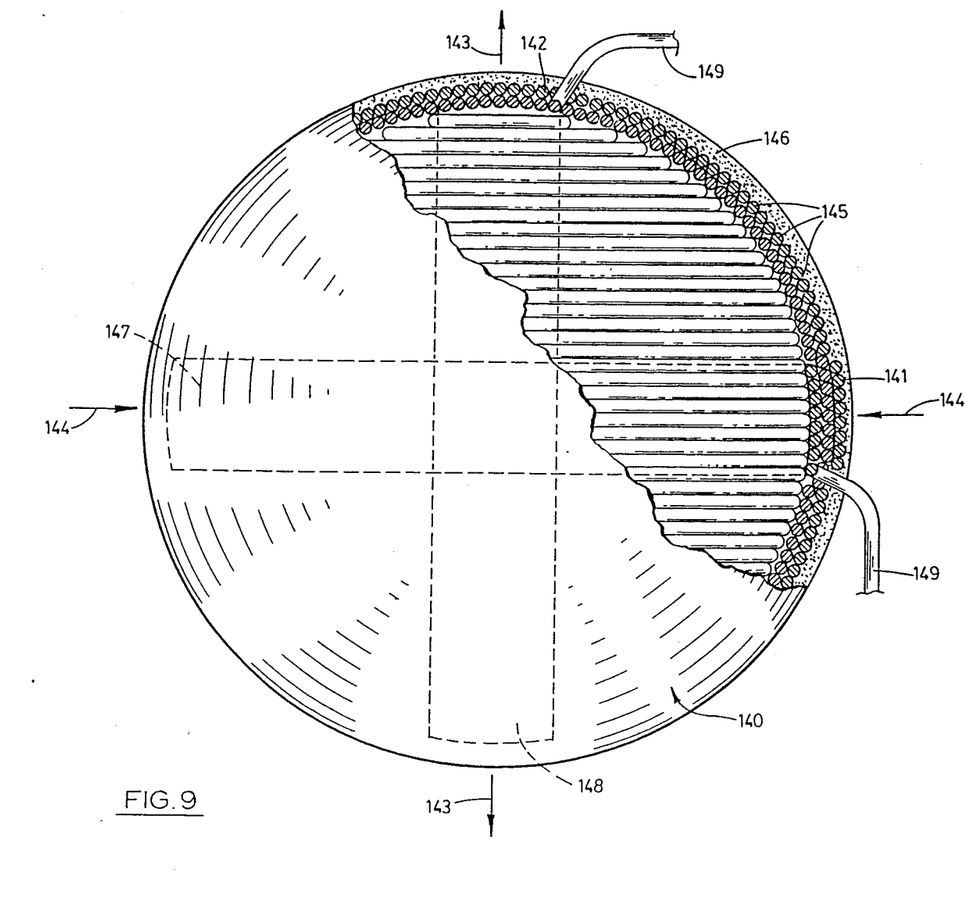
FIG. 9 is a view of a hydrophone which is a sixth embodiment of the present invention characterized by a generally spherical shell of composite material wound so that the effective modulus of elasticity of the shell has a predetermined variation therealong. The shell is depicted with a portion broken away to share its composite construction.

FIG. 9 shows a hydrophone which is a sixth embodiment of the present invention characterized by having a shell 140 constructed so that the modulus of elasticity of the shell is greater in an equatorial circumferential region 141 than in a meridional circumferential region 142. As a result, when shell 140 is subjected to increasing external pressure it expands along an meridional or polar axis as indicated by arrows 143 and contracts along an equatorial axis as indicated by arrows 144. Such a variation in modulus of elasticity may be provided in a number of ways, which will be apparent to one skilled in the art, as by equatorial inserts of stiffer material or by a construction of composite material using fibers of different moduli of elasticity. Such a construction is shown in FIG. 9 and is believed particularly convenient and rugged and utilizes well-known composite construction having fibers 145 secured together by a binder 146. As shown in FIG. 9, the fibers are wound in turns of increasing diameter about an axis in the equatorial plane of the spherical shell 140 so that the largest diameter turns are at the equatorial region 141 and tensioned by bending of the shell so that the modulus of elasticity in this region is relatively high due to the, typically, relatively high modulus of the fibers in tension. However, at the polar region the stiffness in bending is provided only by the binder, typically epoxy material of low modulus of elasticity. As a result, shell 140 will undergo differential circumferential variations in regions 141 and 142 when the shell is immersed in a fluid having acoustic vibrations. These differential variations may be detected interferometrically, in a manner similar to that shown in FIGS. 1 and 2, by a pair of optical fiber windings 147 and 148 disposed, respectively, in regions 141 and 142. Preferably and as shown in FIG. 9, optical fiber windings 147 and 148 are buried within shell 140 by being wound during the winding of fibers 143 and are connected to other elements of an interferometer by end portions 149 left outside shell 140 during winding thereof.

EXAMPLE

To set forth the manner of making a flextensional hydrophone of the present invention and further illustrate the advantages thereof, the calculations for a typical design of first embodiment of such hydrophone, as shown in FIGS. 1 and 2, will now be presented after developing certain helpful and necessary equations using the symbols previously utilized.

The lowest frequency mode of vibration for a hydrophone shell, such as shell 20, must be higher than any acoustic frequencies to be received and, for use in a multiplexed array, should be less than one-half of the sampling frequency. The natural vibration frequencies may be obtained by including inertial effects in the membrane theory, and the free vibration frequencies for prolate and oblate spheroidal shells in vacuum are known as is the effect of a surrounding fluid on the natural frequencies of prolate spheroidal shells. In general, an ellipsoidal shell has slightly higher natural frequencies in vacuum than those of a spherical shell with a radius equal to the semi-major axis of the ellipsoid, while an ellipsoidal shell surrounded by a fluid has lower natural frequencies than if an vacuum due to the additional entrained mass caused by fluid loading. Hence, the natural frequency of an ellipsoidal shell in a fluid should be approximately the natural frequency of a circumscribed spherical shell of the same thickness in a vacuum. The lowest frequency mode of a thin spherical shell is independent of thickness and for $\nu = 0.25$ is:

$$f_0 = \frac{0.12}{r} \sqrt{\frac{E}{\rho}} \tag{11}$$

where $f_0$ is the frequency, $\rho$ is the density of the shell material and r is "a" for an oblate spheroid and "b" for a prolate spheroid. For values of $\nu$ between zero and one-half the value of the constant term in equation (16) can vary by about $+15\%$ which is not significant here.

The strength of a hydrophone shell, such as shell 20, determines its maximum operating depth and must, therefore be above its buckling pressure. It is known that the buckling pressure of an oblate spheroidal shell is greater that of a spherical shell having a radius of curvature equal to that of the oblate spheroid at a pole. Similarly, the buckling pressure of a prolate spheroidal shell is greater than that of a toroidal shell having radii of curvature equal to those of the prolate spheroid at the equator. The actual bucking pressure of an oblate spheroidal shell may be only half of the theoretical value due to the presence of imperfections, whereas as prolate spheroidal shell is not very imperfection sensitive. In view of known calculations involving these considerations, an ellipsoidal shell should not buckle if the static pressure is less than $$\frac{Et^2b^2}{2a^4} \text{ for } a \geq b \tag{12}$$

or less than $$\frac{Et^2}{2b^2 - a^2} \text{ for } a \leq \frac{2b}{3} \tag{13}$$

To make comparisons between optical fiber interferometric hydrophones of different designs, it is customary to define a normalized sensitivity $M_o = \Delta\phi/\phi p = 2\Delta L/Lp$. In this definition, the factor of two arises historically since the original hydrophone designs required an inert reference leg and the present design uses two active coils or wrappings; $\phi$ is the optical phase angle, and L is the length of both interferometer legs such as wrappings 22 and 22. Utilizing equations (6) and (7) above it can be shown that:

$$\Delta L = \Delta C_E - \Delta C_M = \tag{14}$$

$$\frac{\pi pab}{2Et} \left[ 2\frac{a^3}{b^3} + \frac{a^2}{b^2} - 2(2 - \nu)\frac{a}{b} + (1 - 2\nu) \right]$$

where N is the turns ratio of two equal length wrappings and is given by $N = N_M/N_E$ where $N_E$ is the number of turns around the equator and $N_M$ is the number of turns around the meridian, $N_E$ and $N_M$ being, in general, non-integer since L is the total length of wrappings 21 and 22.

It is apparent that the sensitivity of an oblate spheroidal fiber-optic flextensional hydrophone is increased by increasing aspect ratio (a/b) and overall size, and decreasing shell thickness and the Young's modulus of the shell material; however, the sensitivity can only be increased subject to the maximum operating depth, which sets the static pressure P, and the bandwidth. The maximum operating depth is set by the buckling pressure is given by equations (12) and (13) above. This can set the value of t/b in terms of the aspect ratio:

$$\frac{t}{b} = \sqrt{\frac{2P}{E}} \left(\frac{a}{b}\right)^2 \tag{15}$$

For membrane theory to be valid, the maximum value of t/b is limited by equations (3) and (4). A conservative interpretation of the strong inequality would place $t/b = 0.1(b/a)^3$. Applying this constraint to equation (15) gives the following expression for the optimum aspect ratio, $(a/b)_P$, if pressure tolerance is the only constraint:

$$\left(\frac{a}{b}\right)_P = \left(\frac{E}{200P}\right)^{1/10} \approx 0.6 \sqrt[10]{\frac{E}{P}} \tag{16}$$

This is obviously an exceedingly weak function of both E and P since if E/P doubles, the optimum aspect ratio will increase by only 7%.

The choice of operating bandwidth then can be used to set the maximum value of the semi-major axis, r, of the hydrophone. In order to satisfy the compactness criterion, which requires that an omnidirectional hydrophone be much smaller than the wavelength $\lambda = c/f$ of the sound it is intended to detect, the semi-major axis is restricted to $2\pi r/\lambda \leq 1$. The largest value of r which still safely satisfies the compactness criterion is $$r = \frac{0.16c}{f_{max}} \tag{17}$$

where c is the speed of sound in the fluid and $f_{max}$ is the highest frequency at which the hydrophone will be expected to exhibit an isotropic sensitivity. This choice of r will result in the smallest possible resonant frequency fo for a given bandwidth $0 \leq f \leq f_{max}$. Since $(E/\rho)^{\frac{1}{2}}$, the speed of extensional waves in a thin bar made of the shell material, is less than four times the speed of sound in water, equations (11) and (17) predict that $fo \leq 3 f_{max}$.

To illustrate the design procedure and to compare the performance of a resulting hydrophone of the first embodiment, there is now presented a design thereof using 2024-T3 aluminum ($E = 7.31 \times 10^{10}$ Pa, $\nu = 0.33$, $\rho = 2770$ Kgm/m$^3$), with a maximum operating pressure of $6.9 \times 10^6$ Pa, equivalent to a depth of 2300 ft, and assuming $f_{max} \approx 5$ kHz. Starting with equation (16) we obtain the optimum aspect ratio $(a/b)_p = 1.52$. Substituting this into equation (15) sets $t/b = 0.032$. $N = 1.18$ is a lower-bound as given by:

$$N \geq \sqrt{\frac{2}{1 + \frac{b^2}{a^2}}} \tag{18}$$

Equation (14) then yields the normalized sensitivy $M_o = 5.4 \times 10^{-10}$ Pa$^{-1}$. This is 3 dB between than typical prior art hydrophones using optical fiber wrapped cylinders which have a calculated sensitivity of $M_o = 3.8 \times 10^{-10}$ Pa$^{-1}$ and 29 dB better than typical conventional coated-fiber designs $M_o = 2 \times 10^{-11}$ Pa$^{-1}$. The calculation, thus far, has set the ratios of t/b and a/b but has not set the absolute size of the hydrophone which is obtained by using the frequency response. With $f_{max} \approx 5$ kHz, equation (15) then places $a_{max} = 4.8$ cm and $t = 1$ mm. The size cannot be reduced indefinitely since the absolute sensitivity of the hydrophone is proportional to the product of the normalized sensitivity, $M_o$, and the length of the fiber used in the coils, L. As the size is reduced, it is not possible to place sufficient optical fiber around the circumferences of a shell such as shell 20 in FIG. 1.

Unlike the prior art optical fiber, interferometric hydrophones, a flextensional hydrophone of the present invention as shown in FIG. 1 does not require difficult winding techniques or access to the interior of the hydrophone. In addition to simplifications in fabrication procedures, the entirely external wrappings allow the creation of multi-element arrays of flextensional hydrophones. The equatorial and meridional wrappings of several different spheroidal sized oblate connected shells can be connected in series to increase bandwidth or several hydrophones with equal sized spheroidal shells may be arranged in an arrayed to improve noise rejection.

Obviously many modifications and variations of the present invention are possible in light of the above teachings. It is, therefore, to be understood that the present invention may be practiced within the scope of the following claims other than as specifically described.

What is claimed is:

1. A sensor for pressure variations in a fluid, such variations having a predetermined frequency range and the sensor comprising:
   an elastic and ellipsoidal shell having an interior surface and immersible in the fluid so that such variations induce in the shell deformations corresponding to the variations, and
   transducer means for providing a signal corresponding to said deformations, said transducer means including
      a mass disposed centrally within the shell,
      a resilient cylinder extending axially between said mass and said surface and having with said mass a natural frequency of oscillation substantially lower than said predetermined frequency range so that such variations thereat cause corresponding changes in the length and in the circumference of the cylinder, and
      an optical fiber having a plurality of turns wrapped in tension about the circumference of the cylinder so that the fiber has interferometrically detectable changes in length corresponding to said changes in said circumference.

2. A sensor for pressure variations in a fluid, the sensor comprising
   an elastic and ellipsoidal shell immersible in the fluid so that such variations induce in the shell deformations corresponding to the variations, and
   transducer means for providing a signal corresponding to said deformations, said transducer means including an optical fiber wrapped about the shell and fixedly connected thereto so that said fiber has interferometrically detectable changes in length corresponding to said deformations of the shell.

3. The sensor of claim 2 wherein said shell is substantially a spheroid having a pair of orthogonaly related axes of different lengths and wherein said fiber is one fiber of a pair thereof wrapped circumferentially about said spheroid along each of said axes.

4. The sensor of claim 3 wherein said fibers are a pair of legs of an interferometer.

5. A sensor for fluid pressure vibrations, the sensor comprising:
   a generally spheroidal and elastic shell having a pair of orthogonally related axes of unequal length and having a pair of circumferential directions around the shell corresponding to said axes so that, when the shell is subjected to such vibrations, said vibrations induce in said directions differential variations in the circumference of the shell; and
   transducer means extending circumferentially about the shell for detecting said variations, wherein said transducer means comprises a pair of strain detecting elements, one element of said pair being wrapped circumferentially about the shell in one of said directions, the other element wrapped circumferentially about said shell in the other of said directions.

6. The sensor of claim 5 wherein, in said transducer means, one of said strain detecting elements is a reference element.

7. The sensor of claim 5 wherein said shell is oblate and the relative lengths of said axes are such that, for increasing and for decreasing fluid pressure to which the shell is subjected due to said vibrations, the circumference of the shell about one of said axes increases and the circumference of the shell about the other of said axes decreases.

8. A sensor for fluid pressure vibrations, the sensor comprising:
   a generally spheroidal and elastic shell having a pair of orthogonally related axes of unequal length and having a pair of circumferential directions around the shell corresponding to said axes so that, when the shell is subjected to such vibrations, said vibrations induce in said directions differential variations in the circumference of the shell; and
   transducer means extending circumferentially about the shell for detecting said variations and having a pair of strain detecting elements, one element of said pair being wrapped circumferentially about the shell in each of said directions and said pair of elements being a pair of optical fibers of substantially equal length connected as a pair of legs of interferometer means for detecting said vibrations by detection of differences in the lengths of said fibers.

9. The sensor of claim 8 wherein said pair of optical fibers are wrapped about said shell in tension and externally thereof.

10. A sensor for fluid pressure vibrations, the sensor comprising:
    an elastic shell of oblate spheroidal configuration, the shell having a pair of orthogonally related axes of unequal length and having a pair of circumferential directions around the shell corresponding to said axes so that, when the shell is subjected to such vibrations, said vibrations induce in said directions differential variations in the circumference of the shell, the relative lengths of said axes being such that, for increasing and for decreasing fluid pressure to which the shell is subjected due to said vibrations, the circumference of the shell about one of said axes increases and the circumference of the shell about the other of said axes decreases; and
    transducer means extending circumferentially about the shell for detecting said variations, said transducer means including a pair of optical fibers, which are of substantially equal length and are wrapped circumferentially about the shell in each of said directions so that said pair of fibers are connectable as pair of legs of said interferometer means for detecting said vibrations by detection of said differences in the lengths of said fibers.

11. A sensor for fluid pressure vibrations, the sensor comprising:
    an elastic shell of oblate spheroidal configuration, the shell having a pair of orthogonally related axes of unequal length and having a pair of circumferential directions around the shell corresponding to said axes so that, when the shell is subjected to such vibrations, said vibrations induce in said directions differential variations in the circumference of the shell, the relative lengths of said axes being such that, for increasing and for decreasing fluid pressure to which the shell is subjected due to said vibrations, the circumference of the shell about one of said axes increases and the circumference of the shell about the other of said axes decreases,
    the shell being constructed of a predetermined material,
    the thickness of the shell being such that, at any location thereon and in a direction circumferentially of the shell, the shell is subjected to generally the same stress radially across the shell, and the relative lengths of said pair of axis being such that $$A/B > (2-\nu)^{\frac{1}{2}}$$

where "A" is the length of the longer axis, "B" is the length of the shorter axis, and "$\nu$" is Poisson's ratio of said material; and transducer means extending circumferentially about the shell for detecting said variations.

12. A sensor for a pressure variation in a fluid, the sensor comprising:
a spheroidal and elastic shell immersible in the fluid, the shell having a pair of circumferential directions therearound corresponding to a pair of orthogonally related axes of the shell, and the shell having a construction such that, when the shell is subjected to such a pressure variation, there is a differential variation in the circumference of the shell in each of said directions; and
transducer means having a pair of elements for detecting said differential variation, an element of said pair extending circumferentially about the shell in one of said directions so that one of said elements is a reference element wrapped circumferentially about said shell in the other of said directions.

13. The sensor of claim 12 wherein said construction comprises
said shell being an oblate ellipsoid of substantially uniform thickness;
said shell being formed of material having isotropic elastic properties; and
one of said axes being the shortest axis of the ellipsoid.

14. The sensor of claim 12 wherein said construction comprises the shell having greater thickness in a circumferential region corresponding to one such direction than in a circumferential region corresponding to the other such direction.

15. The sensor of claim 12 wherein said construction comprises the modulus of elasticity of the shell being greater in a circumferential region corresponding to one such direction than in a circumferential region corresponding to the other such direction.

16. A sensor for a pressure variation in a fluid, the sensor comprising:
a spheroidal and elastic shell immersible in the fluid, the shell
being of substantially uniform thickness,
being formed of material having isotropic elastic properties, and
being an oblate ellipsoid having a pair of circumferential directions therearound corresponding to a pair of orthogonally related axes of the ellipsoid, one of said axes being the shortest axis of the ellipsoid,
so that, when the shell is subjected to such a pressure variation, there is a differential variation in the circumference of the shell in each of said directions, and
the shell being a thin shell and the relative length of said pair of axes being substantially in accordance with $$A/B > (2-\nu)^{\frac{1}{2}}$$

where B is the length of said shortest axis, A is the length of an axis orthogonal to said shortest axis, and $\nu$ is Poisson's ratio for said material, so that when the shell is subjected to an increasing such variation the circumference of the shell in such a direction corresponding to said shortest axis decreases and the circumference of the shell corresponding to such axis orthogonal to said shortest axis increases and so that when the shell is subjected to a decreasing such variation the circumference of the shell in such a direction corresponding to said shortest axis increases and the circumference of the shell corresponding to such axis orthogonal to said shortest axis decreases; and
transducer means having a pair of elements for detecting said differential variation, an element of said pair extending circumferentially about the shell in each of said directions so that one of said elements is a reference for the other.

17. A hydrophone for detecting pressure vibrations in a fluid, the hydrophone comprising:
an elastic spheroidal shell, which is of oblate configuration so that the shell has a shortest axis and has a longer axis orthogonally related thereto, which is of substantially uniform thickness, and which is constructed of a material having substantially uniform elastic properties, the shell being immersible in said fluid so that the circumference of the shell about each of said axes changes in length due to said vibrations and so that, due to said oblate configuration, the circumference of the shell about the shortest axis has a different change in length during each vibration than the circumference about said longer axis;
a first optical fiber wrapped in tension about the shell circumferentially of said shortest axis so that the length of said first fiber varies during said vibrations in correspondence with such change in length of the shell about the shortest axis;
a second optical fiber wrapped in tension about the shell circumferentially of said longer axis so that the length of said first fiber varies during said vibrations in correspondence with such change in length of the shell about the longer axis; and
interferometer means connected to said first optical fiber and to said second optical fiber for detecting relative changes in lengths of said fibers due to changes in the circumference of the shell caused by said vibrations and for generating a signal corresponding to said pressure vibrations.

18. The hydrophone of claim 17 wherein said first and said second optical fibers are each disposed in a plurality of turns wrapped about the exterior of the shell.

19. The hydrophone of claim 17 wherein the ratio of the width of the shell along said longer axis to the width of the shell along said shortest axis is greater than the square root of a number which is the integer 2 minus Poisson's ratio for said material of which the shell is constructed, whereby such changes in length of the circumference of the shell about said shortest axis are of opposite sign to such changes in length of the circumference of the shell about said longer axis.

20. The hydrophone of claim 17 further comprising:
an elastomeric envelope surrounding said shell;
an orifice defined by said shell and providing restricted fluid communication between the exterior and interior thereof; and
a quantity of liquid filling said envelope and said shell;
whereby said liquid equalizes static pressure between the exterior and exterior of said shell through said orifice.

* * * * *